(12) United States Patent  
Jones

(10) Patent No.: US 8,884,457 B1  
(45) Date of Patent: Nov. 11, 2014

(54) SAIL-BASED ELECTRICAL GENERATION SYSTEM AND METHOD

(71) Applicant: The Boeing Company, Seal Beach, CA (US)

(72) Inventor: Johnathan M Jones, Lake City, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/917,815

(22) Filed: Jun. 14, 2013

(51) Int. Cl.
*H02P 9/04* (2006.01)

(52) U.S. Cl.
USPC ................................................ 290/54; 290/43

(58) Field of Classification Search
USPC .............................. 290/42, 54, 43, 44, 53, 55
See application file for complete search history.

(56) References Cited

U.S. PATENT DOCUMENTS

| | | | | | |
|---|---|---|---|---|---|
| 4,389,843 | A | * | 6/1983 | Lamberti | 60/507 |
| 4,560,884 | A | * | 12/1985 | Whittecar | 290/42 |
| 5,708,305 | A | * | 1/1998 | Wolfe | 290/53 |
| 7,023,104 | B2 | * | 4/2006 | Kobashikawa et al. | 290/42 |
| 7,315,092 | B2 | * | 1/2008 | Cook | 290/53 |
| 7,456,512 | B2 | * | 11/2008 | Nadel | 290/53 |
| 7,598,624 | B2 | * | 10/2009 | Loui et al. | 290/42 |
| 8,049,357 | B2 | * | 11/2011 | Saavedra | 290/54 |

* cited by examiner

*Primary Examiner* — Nicholas Ponomarenko
(74) *Attorney, Agent, or Firm* — Parsons Behle & Latimer

(57) ABSTRACT

An energy generating system includes a first pair of elongate arms, having proximal and distal ends, configured for substantially symmetrically opposing reciprocal swinging motion in a substantially horizontal plane. A first pair of substantially vertical sails are each attached at the distal end of one of the elongate arms, the sails being configured to drive opposing reciprocal swinging motion of the arms in response to a flow of fluid therepast. A first generator assembly is attached to the proximal ends of the first pair of arms, and is configured to generate electrical energy from the substantially symmetrical opposing reciprocal swinging motion of the arms.

20 Claims, 11 Drawing Sheets

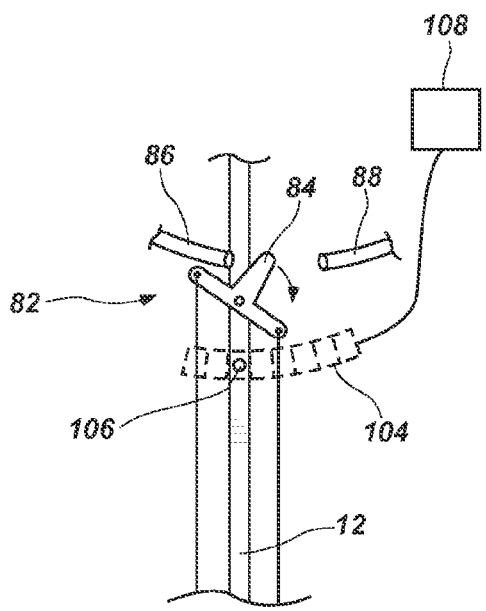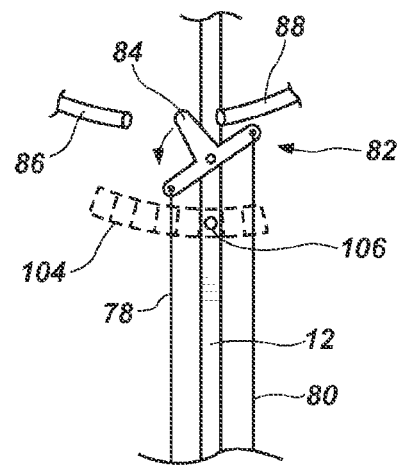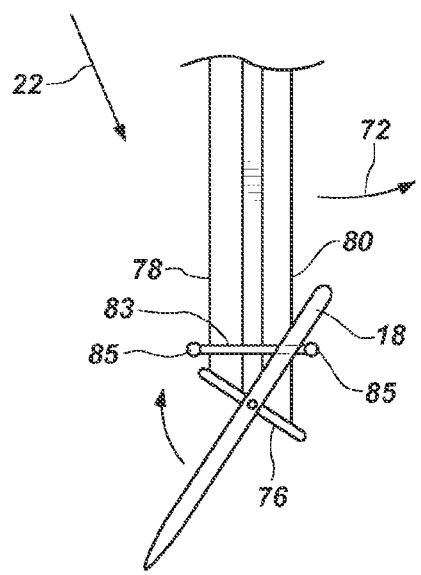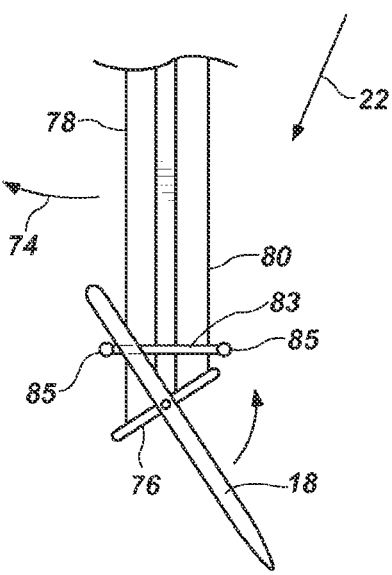
FIG. 7A  FIG. 7B

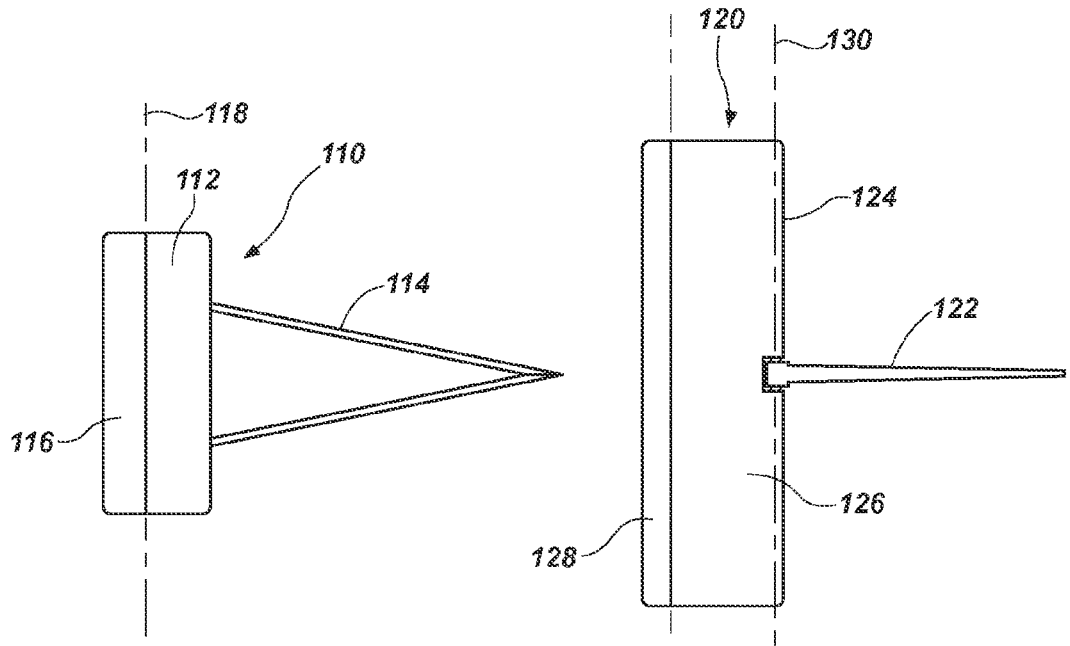
FIG. 10
FIG. 11
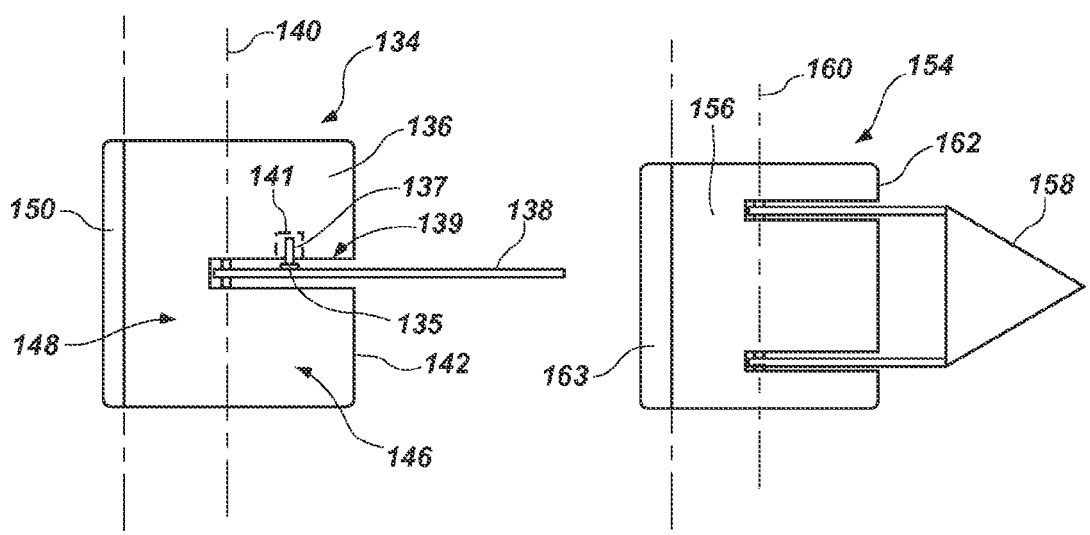
FIG. 12
FIG. 13

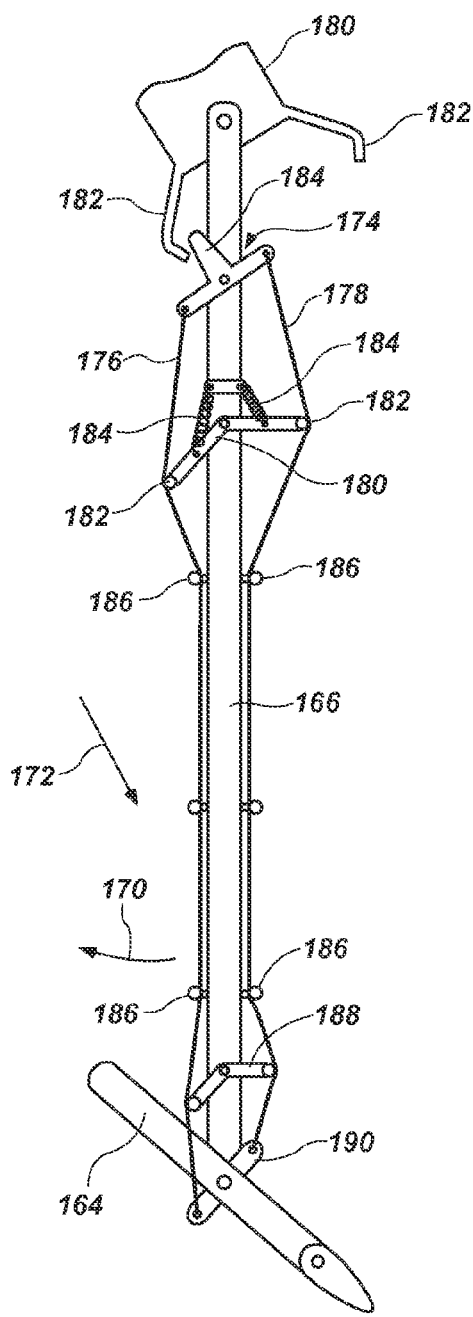
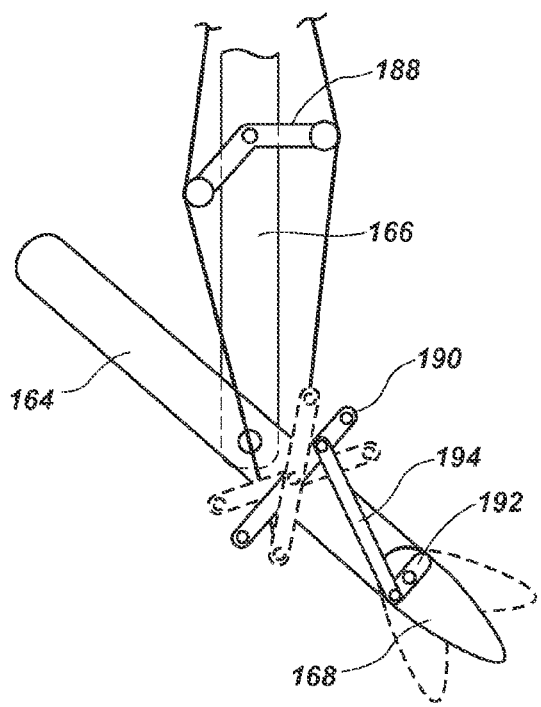
FIG. 14
FIG. 15

SAIL-BASED ELECTRICAL GENERATION SYSTEM AND METHOD

BACKGROUND

Hydroelectric dams and windmills are two of many "green" energy technologies that allow the generation of electricity without burning fuel or creating pollution. However, hydroelectric dams and windmills present a number of challenges that limit their economic and technological viability. First, these technologies are very site-specific. A hydroelectric generating facility requires sufficient water head (i.e. vertical drop) and a constant water supply, coupled with a site that is suitable for a dam. Essentially all good hydroelectric dam sites in the United States have already been used, and environmental and wildlife-related opposition to blocking river flows essentially precludes the construction of any more significant hydroelectric generating facilities in the U.S. Hydroelectric systems are also very expensive to construct and take many generations for economic payback.

While windmills do not involve blocking streams, they are only economically feasible in places with sufficient mass air flows. Typical utility-scale wind generators have a relatively high wind threshold, and do not operate in low winds (e.g. below about 7-10 mph). This limits wind generation to areas with relatively constant high winds. Moreover, since wind speeds fluctuate, wind generation is not as reliable as other sources, and thus is not viewed as being viable for generating base power for an energy utility. Wind generation also presents some hazards to birds and other wildlife, and can produce noise pollution. Additionally, useful sites for both wind and hydroelectric power are often quite distant from population centers, thus involving long transmission lines, towers, etc., and a concomitant loss of energy and efficiency.

Given the challenges associated with hydroelectric and wind-based generation of electricity using conventional methods, other methods of generating electricity from wind and water are desirable. The present disclosure seeks to address one or more of the above issues.

SUMMARY

It has been recognized that it would be desirable to have a system and method for generating electricity from wind and/or water that is simple and economical to implement.

It has also been recognized that it would be advantageous to have a system and method for generating electricity from wind or water that can operate in relatively low speed flows.

It has also been recognized that it would be advantageous to have a single system that can generate electricity from both wind and water.

In accordance with one aspect thereof, this disclosure provides an energy generating system that includes a first pair of elongate arms, having proximal and distal ends, configured for substantially symmetrically opposing reciprocal swinging motion in a substantially horizontal plane. A first pair of substantially vertical sails are each attached at the distal end of one of the elongate arms, the sails being configured to drive opposing reciprocal swinging motion of the arms in response to a flow of fluid therepast. A first generator assembly is attached to the proximal ends of the first pair of arms, and is configured to generate electrical energy from the substantially symmetrical opposing reciprocal swinging motion of the arms.

In accordance with another aspect thereof, this disclosure provides a sail-based energy generating system that includes a first pair of substantially vertical sails, attached at distal ends of a pair of elongate arms. The sails are configured to drive opposing reciprocal swinging motion of the arms in response to flow of fluid therepast. At least a portion of the first sails are pivotally moveable about a substantially vertical axis, whereby a pitch of the sails is adjustable to drive the opposing reciprocal swinging motion. A first generator assembly is attached to the proximal ends of the elongate arms, and is configured to generate electrical energy from the substantially symmetrical opposing reciprocal swinging motion of the arms.

In accordance with yet another aspect thereof, the disclosure provides a method of generating electrical energy. The method includes disposing a first pair of sails in a flowing fluid, the sails being mounted on distal ends of first opposing arms, and periodically adjusting a pitch of the first pair of sails so as to generate an opposing reciprocal swinging motion of the first opposing arms in response to flow of the fluid past the first sails. The method further includes capturing mechanical energy of the opposing reciprocal swinging movement of the opposing arms in a first generator assembly and generating electrical energy therefrom.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein:

FIGS. 7A and 7B are top views of the arms and sails with the sails in oppositely pitched orientations, respectively, showing one embodiment of a mechanism for adjustment of the pitch of the sails;

FIGS. 10-13 are side views of several exemplary sail configurations that can be used with a sail-based electrical generating system in accordance with the present disclosure;

FIG. 14 is a top views of an embodiment of an arm and sail, showing one embodiment of a mechanism for adjustment of the pitch of a rudder;

FIG. 15 is a detail top view of the rudder pitch control mechanism of FIG. 14;

DETAILED DESCRIPTION

Figure 1:
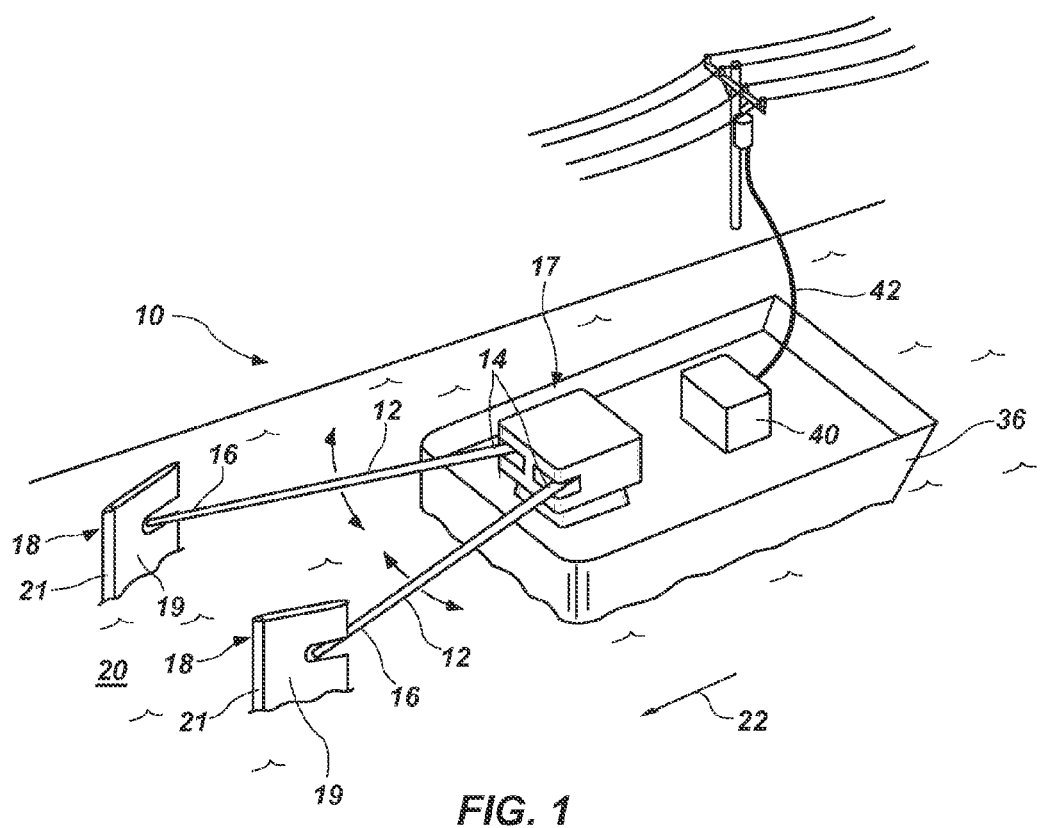
FIG. 1 is a perspective view of an embodiment of a hydrosail electrical generating device mounted upon a floating barge.

Reference will now be made to examples illustrated in the drawings, and specific language will be used herein to describe the same. It will nevertheless be understood that no limitation of the scope of the disclosure is thereby intended. Alterations and further modifications of the inventive features illustrated herein, and additional applications of the principles of the various aspects of the disclosure, as illustrated herein, which would occur to one skilled in the relevant art and having possession of this disclosure, are to be considered within the scope of the disclosure.

As used herein, positional and directional terms, such as "front," "back," "top," "bottom," "above," "below," "in," "out," "up," "down," and the like, are to be interpreted relative to the respective illustrations in the drawings. These terms are used for the purpose of description in connection with the drawings only, and do not necessarily indicate a specific direction, position or orientation relative to any other thing or any other positional or directional reference system, unless otherwise indicated. Those of skill in the art will recognize that the apparatus described herein may be used in a variety of orientations in which positional and directional terms could be used differently.

Advantageously, a sail-based electrical generating system has been developed, as disclosed herein. This system converts slow-moving currents of water and air into electrical energy. It can be deployed in certain locations in which other designs cannot be used to generate power. For example, the system disclosed herein can be retrofitted to an existing windmill.

Viewing FIG. 1, an energy generating system 10 in accordance with the present disclosure generally includes a pair of elongate arms 12, having proximal ends 14 and distal ends 16, configured for substantially symmetrically opposing reciprocal swinging motion in a substantially horizontal plane. The proximal ends 14 of the arms 12 are pivotally attached to and supported by a generator assembly 17. A pair of substantially vertical sails 18 are attached at the distal ends 16 of each of the elongate arms 12, the sails 18 being at least partially immersed in a flowing fluid 20 such as water, and configured to drive the opposing reciprocal swinging motion of the arms 12 in response to flow of the fluid therepast. That is, the arms 12 are driven together and apart in a generally horizontal sweeping motion by the sails 18 in response to fluid flow therepast. The direction of flow of the fluid 20 is indicated by arrow 22. The sails 18 can also include a rudder 21 at their trailing edge, the rudder being configured to pivot with respect to the main sail body 19 in a manner similar to aircraft rudders.

The term "fluid" as used herein, has reference to any liquid or gas. The flowing fluids that are primarily contemplated by the present disclosure are water and wind, but the system described herein can conceivably be used with other fluids, whether liquid or gas. The term "sail" as used herein is intended to refer to any device that functions like a sail, whether rigid, semi-rigid or flexible. The figures show various embodiments of sails having a substantially rigid panel or body, configured similar to the vertical stabilizer of an aircraft, though other types and configurations of sails can also be used, including flexible sails. It will also be apparent that the sail panel or body can be substantially solid, or it can have one or more interior spaces for internal structure, such as a rudder control linkage, etc.

Figure 3:
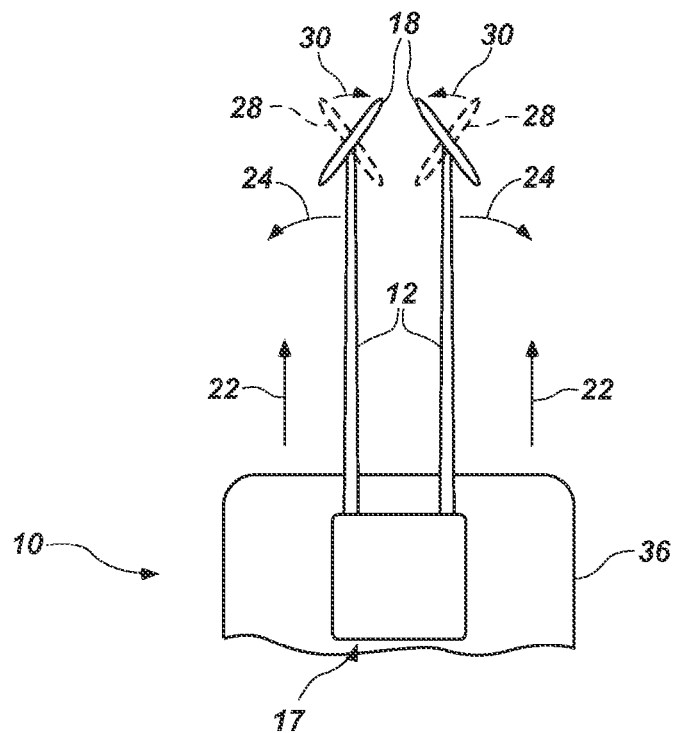
FIG. 3 is a top view of the floating hydrosail electrical generating system of FIG. 1 with the opposing reciprocal arms at their inwardmost position and configured for outward motion, showing how adjustment of the pitch of the sails produces the opposing reciprocal motion.
Figure 4:
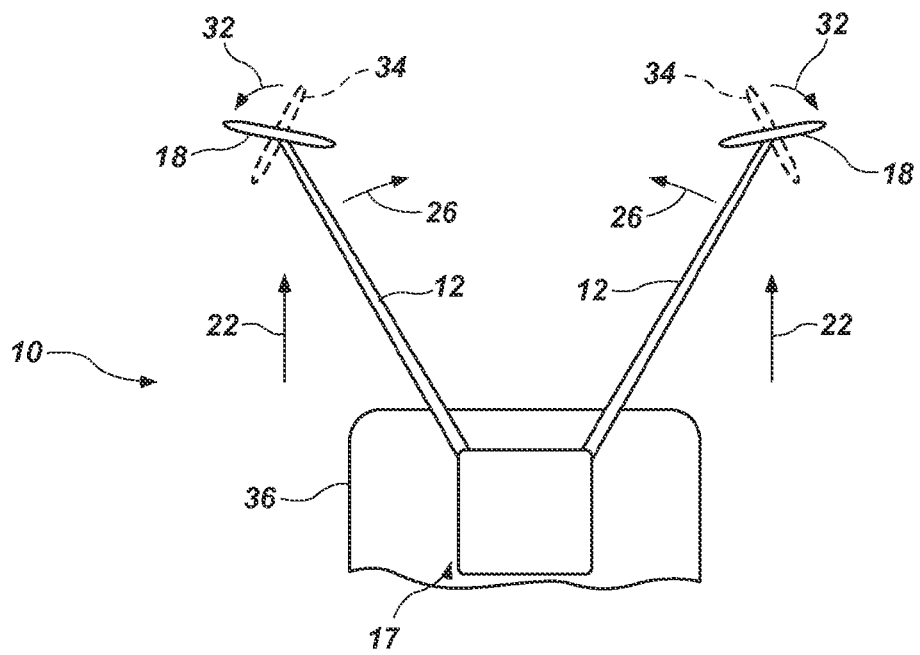
FIG. 4 is a top view of the floating hydrosail electrical generating system of FIG. 1, with the opposing reciprocal arms at their outwardmost position and configured for inward motion, showing how adjustment of the pitch of the sails produces the opposing reciprocal motion.

The reciprocal swinging motion of the arms 12 is illustrated in the views of FIGS. 3 and 4, which show top views of a pair of arms 12 and sails 18, showing how adjustment of the pitch of the sails 18 produces the opposing reciprocal motion. In FIG. 3 the opposing reciprocal arms 12 are at their inwardmost position and configured for outward motion, as indicated by arrows 24. In FIG. 4 the opposing reciprocal arms 12 are at their outwardmost position and configured for inward motion, as indicated by arrows 26. The sails 18 pivot or "tack" back and forth in the current flow, indicated by arrow 22, and thus move the long arms 12 in a swinging motion.

In the embodiment of FIGS. 3 and 4, each sail 18 is pivotable upon its respective arm 12. When the arms 12 reach their closest point, shown in FIG. 3, the pitch of each sail 18 is mechanically switched. In FIG. 3 the orientation of the sails 18 prior to this pivoting action is shown in dashed lines at 28 and the direction of pivoting of the sails is shown by arrows 30. With the sails 18 in the position as shown in solid lines in FIG. 3, the direction of flow 22 of the fluid 20 pushes against the sails 18 in a direction that pushes the arms apart, as indicated by arrows 24. When the arms 12 reach their farthest point, shown in FIG. 4, the pitch of the sail 18 is mechanically switched again, pivoting in the direction of arrows 32 from the position established in FIG. 3 and shown in dashed lines at 34, back to its previous position, shown in solid lines in FIG. 4. With the sails in the position shown in FIG. 4, the flow 22 of the fluid again pushes against sails in a manner that moves the arms 12 back together, in the direction of arrows 26, and the process repeats. This process can repeat so long as the fluid flow is sufficient to do so.

Figure 2:
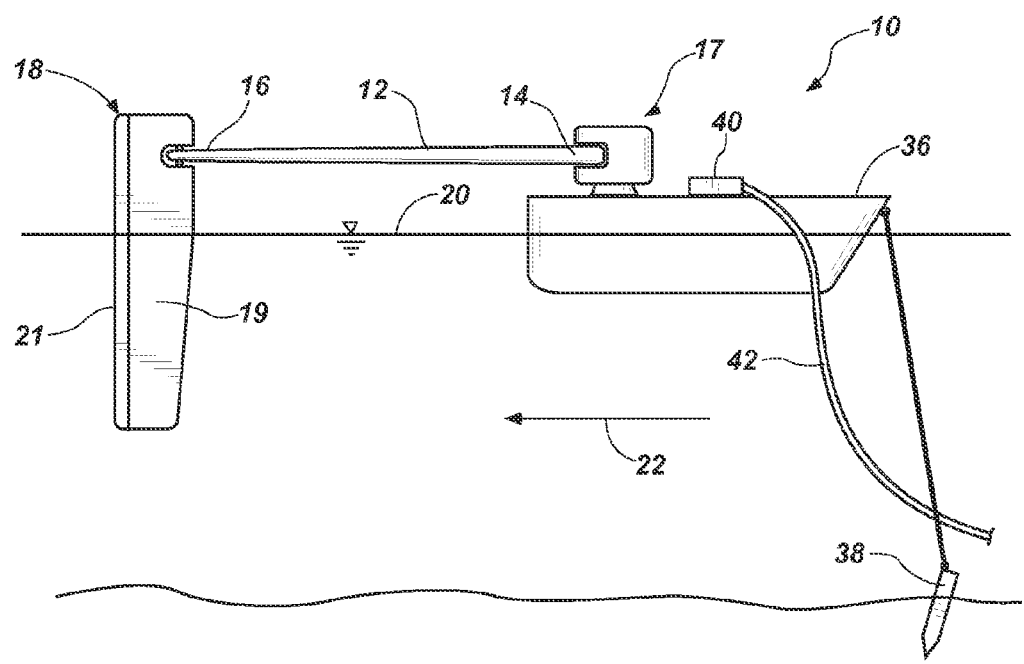
FIG. 2 is a side view of the floating hydrosail electrical generating system of FIG. 1.

In the sail-based generating system 10 shown in FIGS. 1 and 2, the generator assembly 17 is supported upon a floating barge 36, which is attached to a fixed anchor 38 in the flowing fluid 20. A generating system of this type with the sails immersed in flowing water can be referred to as a "hydrosail" system and the sails as "hydrosails." The flowing fluid 20 can be a river or a region that has tidal flow, for example. Other bodies of flowing water can also be used. The mechanical energy of the opposing reciprocal swinging motion of the arms 12 is transmitted through a gear train or reduction gear assembly, discussed in more detail below, that is associated with the generator assembly 17, and converted to electrical power by a generator. A power conditioning unit 40 can be associated with the generator assembly 17, in order to transform the generated power (e.g. DC power) to AC suitable for use by AC devices or for transmission over a general power distribution system. An electrical power line 42 extends from the generator assembly 17 and power conditioning unit 40 to transport the electrical power to its intended destination.

The sail-based generating system 10 shown in FIGS. 1 and 2 can utilize low speed water flows, like the type commonly found on rivers, and barges incorporating this type of system can be anchored in a river to provide quick, easy, cheap, self-contained units that generate electrical power. Since many cities are located along rivers, transmission lines to transport the electrical power to the end user can often be shortened. Hydrosail generation units on barges can be arranged in many ways, such as lined up end-to-end or side-by-side to utilize shallower flows, while allowing room for river traffic and debris flows. Additionally, since rivers flow continuously, hydrosails can provide continuous power that can provide base energy for an energy utility.

The hydrosail energy generating system shown in FIGS. 1-4, supported upon floating barges, can be modular, and can be almost any desired size, from small limited use units up to large utility scale systems. These can be very useful for generating power in remote areas. For example, a barge-mounted hydrosail device can be towed to a remote area and put into a river or stream to generate electricity for a remote cabin, or for construction workers, hunters, campers, etc. at a single remote site. The size of the hydrosail unit can be large or small, depending upon the size of the stream and the power needs. When the work at the remote site is completed, the unit can simply be towed away on the river or other body of water. On the other hand, multiple barge-mounted units can be placed in a river or other body of water to generate power for a city, for example. These units can be moored in locations that keep them out of the way of river traffic, yet allow the generation of power from the flowing water.

Figure 5:
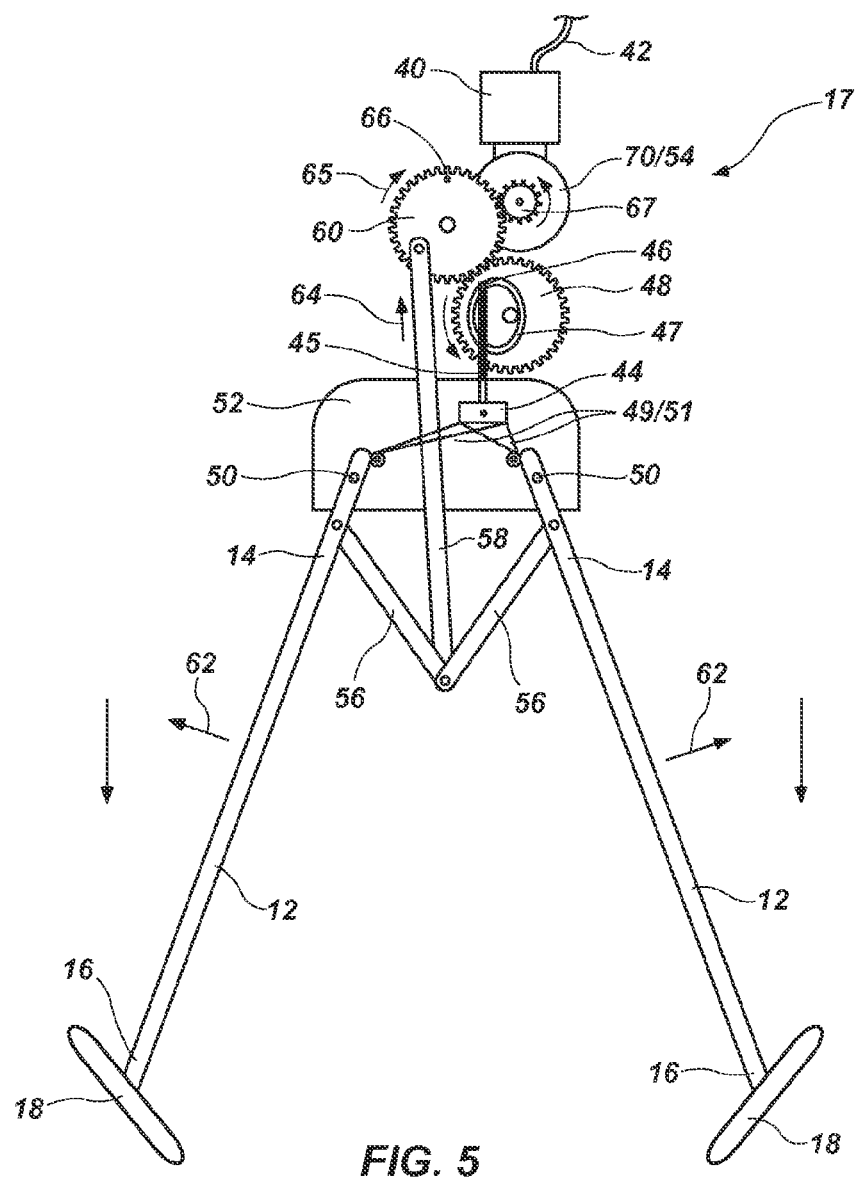
FIG. 5 is a top view of an embodiment of the crank and generator system of a sail-based electrical generating system in accordance with the present disclosure.
Figure 6:
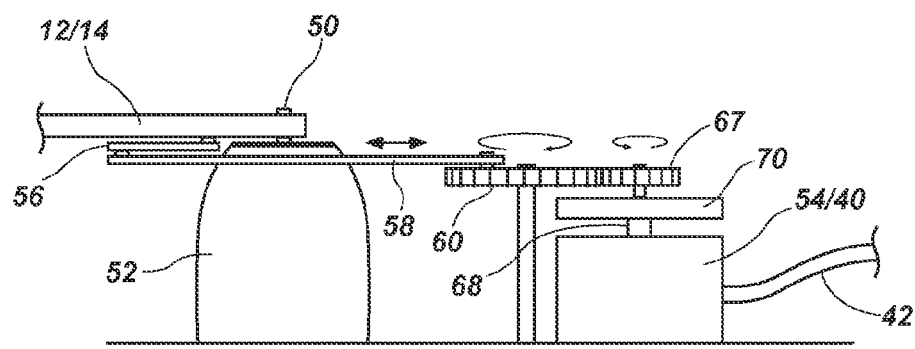
FIG. 6 is a partial side view of the generator and associated structure of the embodiment of FIG. 5.

The way in which the mechanical swinging motion of the arms 12 is captured and harnessed can vary. Top and side views of an embodiment of a mechanism for capturing energy from a pair of swinging reciprocal arms and generating electricity therefrom are shown in FIGS. 5 and 6. The reciprocal arms 12 with sails 18 at their distal ends 16 are attached at a pivot point 50 at their proximal ends 14 to an arm support structure 52. The generator assembly 17 includes a generator 54, which generates the electrical power, and this power is modified if necessary by the power conditioning unit 40 and transmitted via the power line 42, as discussed above.

Mechanical energy from the swinging arms 12 is transmitted to the generator 54 via a drive linkage that includes twin pivoting links 56, which are each pivotally attached at one end to a respective arm 12, and are pivotally attached together at their other ends. A drive rod 58 is pivotally attached at one end to the pivoting links 56 at the point where these two links 56 come together, and at its other end to a gear wheel 60. The swinging arms 12 transmit the sails' mechanical energy to the generator 54 via the drive rod 58, which operates much like a piston rod in an internal combustion engine or the drive rods of a steam-powered locomotive. When the arms 12 swing outward, as indicated by arrows 62 in FIG. 5, this motion is transmitted to the drive rod 58 via the pivoting links 56, causing the drive rod 58 to push in the direction of arrow 64 in FIG. 5, driving the gear wheel 60 in the direction of arrow 65. After the arms 12 reach their outward swinging limit, the change of pitch of the sails 18, discussed above, will cause the arms 12 to reverse direction and begin to draw together. At the beginning of this reversal of motion the drive rod 58 will pass over the top dead center point 66 of the gear wheel 60 and begin to pull the gear wheel so as to continue its clockwise rotation.

The drive linkage not only transmits the mechanical energy of the arms 12 but also coordinates the swinging motion of the arms 12 and makes this motion symmetrical, thus preventing or canceling out any unbalanced torque. Those of skill in the art will recognize that the dimensions and connection points for the pivoting links 56 and drive rod 58 can be selected with reference to the position and diameter of the gear wheel 60 so that the reciprocating swinging motion of the arms 12 causes the drive rod 58 to continuously rotate the gear wheel.

As shown in the top view of FIG. 5 and the side view of FIG. 6, the gear wheel 60 has teeth that intermesh with the teeth of a reduction gear 67, which is attached to a shaft 68 of the generator 54. In this way the rotation of gear wheel 60 is transmitted to the generator 54. The gear wheel 60 and reduction gear 67 form a gear train or reduction gear assembly that transmits the mechanical energy of the swinging arms 12 to the generator assembly 17. It will be apparent to one of skill in the art that the diameter of the gear wheel 60 and the dimension of the moment arm created by the connection of the drive rod 58 thereto, as well as the gear ratio between the gear wheel 60 and the generator 54 and the relative mass of these components can be selected to provide a desired speed range and momentum for these elements. A flywheel 70 can also be attached to the shaft 68 of the generator 54. The momentum of the flywheel 70 helps maintain smooth rotation of the generator shaft 68, and also helps to maintain smooth swinging motion of the arms 12 and unidirectional rotation of the gear wheel 60.

It will be apparent to those of skill in the art that the particular mechanism shown and described herein for converting swinging reciprocal motion of the arms 12 into unidirectional rotational motion of the gear wheel 60 and of the generator 54 is only one of many mechanisms that could be used to convert the mechanical swinging motion of the arms into electrical energy. Any mechanism that can convert the mechanical swinging motion of the arms into electrical energy can be used in connection with the system 10 herein, including, for example, those that use electrical generators that are not based on rotational motion.

As noted above, in order to drive the opposing reciprocal swinging motion of the arms 12, the system 10 includes a mechanism for selectively adjusting the pitch of at least a part of each sail 18. The mechanism for switching and controlling the pitch of the sails 18 or part of the sail can be configured in various ways, from simple and relatively inexpensive purely mechanical systems, to more advanced computer-controlled power-actuated systems. Provided in FIGS. 7A and 7B are top views of an arm 12 with a pivotally attached sail 18, showing operation of one embodiment of a mechanism for adjusting the pitch of the sail 18. The direction of flow of the fluid 20 is indicated by arrows 22. The sail 18 is shown pitched in one direction in FIG. 7A and oppositely pitched in FIG. 7B, so that the flow of the fluid 20 causes swinging motion of the arm 12 about its pivot point 50 in the direction of arrow 72 in FIG. 7A and in the direction of arrow 74 (the opposite direction) in FIG. 7B.

Figure 8:
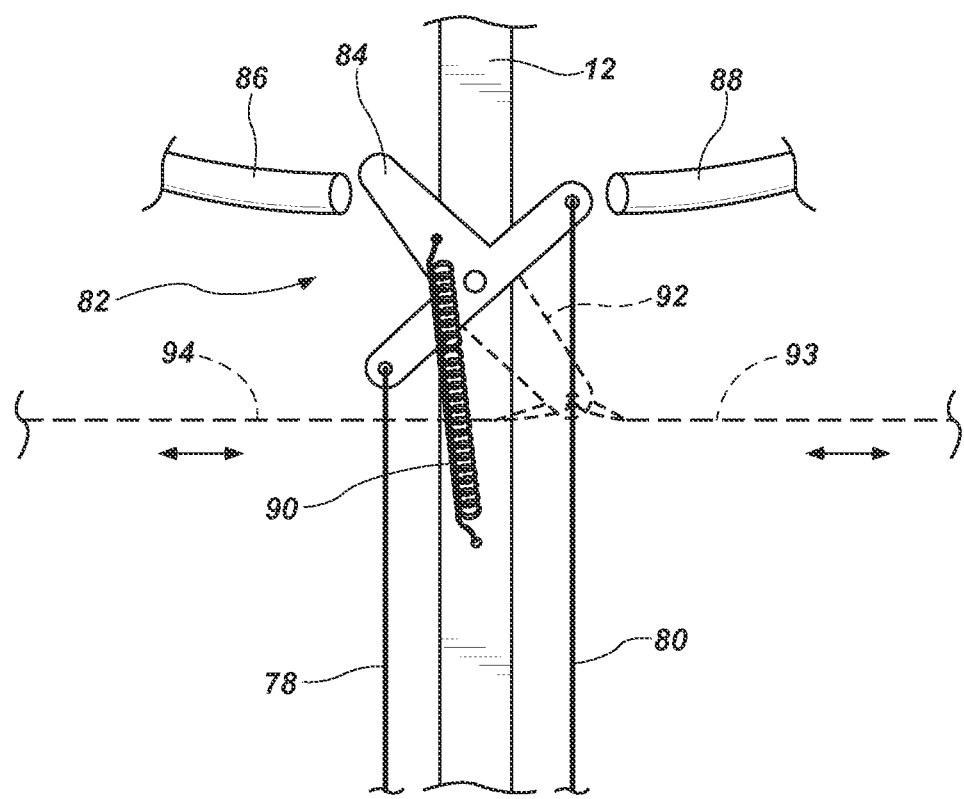
FIG. 8 is a detail diagram showing an embodiment of a portion of a purely mechanical sail pitch control mechanism.

The pitch shifting mechanism shown in FIGS. 7A and 7B can be a purely mechanical system. In this embodiment, the sail 18 includes a pivot arm 76 that is affixed to the sail 18 and pivots with the sail. Attached to the opposite ends of the pivot arm 76 are cables 78, 80. These cables extend along (or through) the arm 12 to corresponding arms of a pitch lever 82 that is pivotally attached to the arm 12. A close-up view of the pitch lever 82 and related structure is shown in FIG. 8. The pitch lever 82 includes an actuating arm 84 that is positioned to alternately contact each of two shift rods 86, 88 at the extreme ends of the motion of the arm 12. When the arm 12 swings to one extreme, the actuating arm 84 of the pitch lever 82 will contact the left shift rod 86 and be pushed (by virtue of the motion of the arm 12) to the position shown in FIG. 7A. The position of the pitch lever 82 just before contacting the left shift rod 86 is depicted in FIG. 8, and the position of the pitch lever 82 just after contacting the left shift rod 86 is depicted in FIG. 7A.

Rotation of the pitch lever 82 at this point of the cycle is transmitted via the cables 78, 80 to the pivot arm 76 of the sail 18, and thus rotates the sail to the position shown in FIG. 7A, initiating motion of the arm 12 in the direction of arrow 72. When the arm 12 swings to the opposite extreme, shown in FIG. 7B, the actuating arm 84 of the pitch lever 82 will contact the right shift rod 88 in a similar manner, thus rotating the pitch lever 82 to the position shown in FIG. 7B. This motion of the pitch lever 82 is transmitted via the cables 78, 80 to the pivot arm 76 of the sail 18, and will rotate the sail 18 to the position shown in FIG. 7B, causing motion of the arm 12 in the direction of arrow 74.

A mechanism can be provided to hold the pitch lever 82 and/or the sail 18 in a given position during transit of the arm 12 through each sweep direction. Shown in FIG. 8 is an over-center spring mechanism that can be used for this purpose. This mechanism includes an over-center tension spring 90, which is attached between a fixed point on the arm 12, and a point on the actuating arm 84 of the pitch lever 82, on opposite sides of the pivot point 92 of the pitch lever 82. This configuration of the spring 90 naturally biases the pitch lever 82 away from its centered position and toward its two extreme tilted positions, shown in FIGS. 7A and 7B. Any sort of mechanism for fixing the extreme tilted positions of the pitch lever 82 and limiting its rotational range of motion can be used. The strength of the spring 90 and the force involved to rotate the pitch lever 82 can be selected to balance the force for holding the sail 18 in a given position and the force involved in switching the position of the pitch lever 82. Those of skill in the art will recognize that other mechanisms for holding the pitch lever 82 and/or the sail 18 in a given position during transit of the arm 12 through each sweep direction can also be used. For example, a detent mechanism (not shown) can potentially be used for this purpose.

A mechanism can also be provided for limiting the range of motion of the sail 18. One embodiment of such a mechanism is shown in the top views of FIGS. 7A and 7B. This mechanism includes a horizontal crossbar 83, attached to the arm 12 near the pivotal attachment point of the sail 18 on the arm 12. The crossbar 83 includes a pair of upright stops 85 at opposite ends of the bar. These stops 85 are positioned to contact the sail 18 at selected extreme points in its pivoting range, so as to physically prevent the sail 18 from pivoting beyond that point. The sail 18 pivots above the crossbar 83, and contacts one stop 85 when it reaches one extreme of its motion, and contacts the other stop 85 when it pivots to the opposite end of its motion. A side view of a similar crossbar 135 and one of its upright stops 137 are shown in the side view of a sail 134 in FIG. 12. The crossbar 135 is attached to the arm 138 within a slot 139 of the sail panel 136. The sail panel 136 can include a reinforced region 141 that is configured to contact the upright stops 137, so that repeated contact with each shifting of the sail does not damage the sail 134. It will be apparent that other types of mechanisms can be used for setting and controlling the range of motion of the sail 18.

It is to be appreciated that many other types and configurations of mechanical systems can be used for shifting the pitch of the sail 18. For example, as one alternative, a cam-based system can also be used. Such a system is illustrated in FIG. 5. In this embodiment, a pitch lever 44 is pivotally attached to the arm support structure 52, and is attached to control cables 49, 51 that extend along or through the swinging arms 12 for control of the pitch of the sail 18. These cables function like the cables 78, 80 described above with respect to FIGS. 7A, 7B and 8.

The pitch lever 44 includes an actuating arm 45 having an elongate slot 46, in which is a pin 46. The pin fits into a cam slot 47 that is located in a cam wheel 48, which is engaged with the gear wheel 60. Rotation of the gear wheel 60 rotates the cam wheel 48. The cam slot 47 can have any desired shape relative to the center axis of the cam wheel 48, so that the pin 46 follows a desired path (e.g. a non-circular path) as the cam wheel 48 rotates. The motion of the pin 46 is converted into back-and-forth tipping motion of the actuating arm 45 of the pitch lever 44, depending on the position of the cam wheel, thus pivoting the pitch lever at certain times relative to the reciprocal motion of the arms. The reciprocal swinging motion of the arms 12 thus controls the pitch arm 44, which pulls on the cables 49, 51 to adjust the pitch of the sail 18.

As an alternative to a purely mechanical pitch adjustment system, various types of power-operated actuators (e.g. electrical, hydraulic, pneumatic, etc.) can be used for controlling the sail pitch. These can use cables, rods, or other actuating members, and can be computer controlled. For example, referring to FIG. 8, rather than moving the pitch lever 82 by contact with the shift rods 86, 88, the pitch lever 82 can instead include an actuating arm 91 that is attached to actuating cables 93, 94, shown in dashed lines. These cables 93, 94 can be attached to a purely mechanical actuating system, or they can be attached to electrical or hydraulic actuators that pull on the respective cables 93, 94 at the appropriate time in order to shift the pitch of the sail 18.

Figure 9:
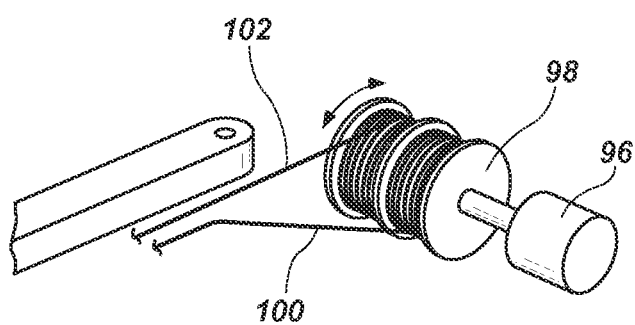
FIG. 9 is an illustration of a portion of an electrically controlled sail pitch control mechanism.

One embodiment of a power-operated actuator for a cable-type system is shown in FIG. 9. In this figure, an electrical actuator 96 is connected to a cable drum 98, which includes two cables 100, 102 that are oppositely wound around the drum 98. Rotation of the drum 98 in one direction simultaneously causes one cable to retract and allows the other to extend. This type of cable control system can be used to directly actuate the sail pitch control cables 78, 80, or it can be used to pull on the pitch lever cables 93, 94 in order to shift the pitch lever 82, or it can be used to actuate rudder control cables, as discussed below.

Other power-operated pitch control devices can also be used, including electrical or hydraulic actuators like those that are commonly used in aircraft, and these can be mounted in various locations. For example, rather than using a pitch adjustment mechanism that is positioned around the proximal ends of the arms 12 and uses cables to move the sail 18, the pitch adjustment can be made via aircraft-type actuators that are installed directly in, on or adjacent to the sail 18, with power transmission devices (e.g. electrical or hydraulic lines) extending along the arm 12 from suitable power sources located near the generator assembly 17. Other configurations can also be used.

A control system for controlling a power-actuated pitch control mechanism using electronic sensors is illustrated in FIGS. 7A and 7B. This system includes an arcuate sensor track 104 that is affixed adjacent to the arm 12 near the pivot point 50 of the arm, with a scan head 106 attached to the arm and aligned with the sensor track 104. As the arm 12 swings, motion of the scan head 106 adjacent to the sensor track 104 produces an electronic signal that is transmitted to a controller 108. This signal can indicate the position, speed and direction of motion of the arm 12. With this information, the controller 108 can send signals to control actuators to adjust the pitch of the sail 18 at any desired time and to any desired degree.

Advantageously, a computer-controlled and power-actuated pitch adjustment system like that disclosed herein can be configured to change the sail pitch at predetermined set points to improve efficiency of the stroke of the swinging arms 12. For example, to optimize power output, the position of the sail 18 can be adjusted at any sweep position or throughout the sweep range, rather than simply having a single static pitch angle set at each end of the sweep cycle. In this way, the stresses on the system 10 and the velocity of swinging can be controlled or adjusted, such as to promote constant velocity rotation of the gear wheel 60 and therefore of the generator 54.

The configuration of the sails 18 (e.g. size, shape, connection mechanism, etc.) can also affect the type and size or power requirements of the sail actuation and control system, and also the power output of the system 10. There are several variables that can be selected with respect to the configuration and operation of the sails 18. Selection of the type and configuration of the sails 18 can depend on the size and scope of the installation. Several examples of sails 18 having different configurations are shown in side views in FIGS. 10-13.

One variable that can be selected with respect to the configuration and operation of the sail 18 is the location and type of connection of the sail 18 to its respective arm 12. Another variable that can be selected is the nature and extent of moveable portions of the sail 18. The sails 18 that are described above and illustrated in FIGS. 3-5 and 7A-B are full-pivoting sails. That is, the entire sail 18 is configured to pivot on the respective arm 12. However, sails having moveable rudders can also be used. The sails 18 shown in FIGS. 1-2 include a main sail body 19 and a moveable rudder 21. As described below, the sails shown in FIGS. 10-13 also include a main sail body and a moveable rudder. The rudders can help control and drive repositioning of the respective sail, and can also contribute to the opposing reciprocal swinging motion of the respective arm. An exemplary mechanism for adjusting the pitch of the rudder is described below with respect to FIGS. 14 and 15.

Referring to FIG. 10, a sail 110 can be configured having a main sail body 112 that is fixedly attached to its swinging arm 114, but includes a pivotal rudder 116 at its extreme distal end. The main body 112 of the sail 110 does not pivot with respect to the arm 114, but the rudder 116 can pivot about a generally vertical axis 118 to drive the reciprocal swinging motion of the arm 114. The relative size and shape of the rudder 116 can be selected to provide a desired operation of this sail 110, and is not limited to the specific size, shape or proportions shown in FIG. 10. Because the main body 112 of this sail 110 is fixed on the arm 114, the angle of the main body 112 does not change relative to the arm 114, but changes relative to the direction of flow of the water or other fluid with swinging of the arm 114. The rudder 116 is moveable like the rudder of an aircraft or boat, and changes angle with respect to the body 112 of the sail 110 in order to shift its direction. Thus, in this configuration, only a portion of the sail 110 changes pitch with respect to the arm 114, and drives the swinging motion of the arm 114.

Alternatively, sails can be configured having both a pivoting main body and a rudder that also pivots with respect to the main body. Various configurations having this feature are shown in FIGS. 1-2 and 11-13. The location of the pivoting connection of the sail to the arm can vary. In the embodiment of FIG. 11, a sail 120 is pivotally attached to its respective arm 122 at a leading edge 124 of the main sail body 126, and also includes a pivotal rudder 128. In this configuration the entire sail 120 pivots about a substantially vertical axis 130 that extends through the leading edge 124 connection location. The pitch of the entire sail 120 is adjustable about this axis 130 to promote the swinging motion of the arm 122. The rudder 128 also pivots about a substantially vertical axis 132 that is along the leading edge of the rudder 128. Thus the entire sail 120 can change pitch with respect to the arm 122, and the rudder 128 can change pitch with respect to the sail body 126.

Having a pivoting rudder in combination with a pivoting sail body can be very desirable. When a sail is pivoted and fixed at some angle with respect to its arm, it is then driven with respect to the current flow, and as the arm swings the angle of the sail will gradually change with respect to the current to a position almost parallel with the current flow. This aspect of fully pivoting sails is illustrated in FIGS. 3 and 4. In this latter portion of the arm's stroke, the power provided by the flow will diminish because the angle of attack of the sail panel is reduced. Advantageously, if the rudder is also pivoted with respect to the sail, the sail and rudder combination can have a higher effective angle of attack and can therefore provide additional driving force in this portion of the stroke. However, at the extreme points in the arm's motion, only a relatively small amount of force will be required to change the pitch of the sail to overcome the force of the current upon it and reverse its angle to begin to push the arm back in the other direction. To facilitate the reverse pitch motion of the sail, the rudder can be straightened (which will be facilitated by the fluid flow itself) and the pitch of the sail can be reversed in the manner discussed above. Since the sail panel is also pivotal, the entire sail will "come about" to re-engage the current when the arm reaches each end of each sweep, as described above. When the system swings or pivots the sail to come about at this point, it will again fully engage the current and commence the power phase of the arm's sweep back in the opposite direction. The rudder can also be used during pivoting of the main sail panel to provide additional force for pivoting the panel.

Another alternative sail configuration is shown in FIG. 12, in which a sail 134 is provided having a main body 136 that is pivotally attached to its arm 138 at a single pivot point near a "midpoint" or "middle axis" 140 that is located back some distance from the leading edge 142 of the sail. In this configuration the entire sail 134 pivots about the middle axis 140, such that the pitch of the entire sail 134 is adjustable to promote the swinging motion of the arm 138, in the manner discussed above.

The precise location of the middle axis 140 can vary. In the embodiment shown in FIG. 12, the middle axis 140 is positioned aft of the sail's axis of symmetry, so that the sail section forward of the middle axis 140 (designated at 146) has more surface area than the aft section (designated at 148) of the sail 134. With this configuration, the current pushing on the sail 134 will tend to keep the sail 134 in its pitched position, rather than tending to straighten it out. With the sail main body 136 in a fixed orientation with respect to the arm 138, in the course of the sweep of the arm 138 the angle of the sail 134 with respect to the current flow will gradually turn from a full-on power tack to a position closer to parallel with the current flow, as discussed above. After the system swings or pivots the sail 134 to come about at this point, it will again fully engage the current and commence the power phase of the arm's 138 sweep back in the opposite direction, and the current flow will again tend to keep the sail 134 in its pivoted orientation.

The sail 134 of FIG. 12 also includes a moveable rudder 150 at its trailing edge, which can pivot in the same manner as the rudders described above, to provide additional control and power and assist in pivoting the main body 136 of the sail 134 at the end of each portion of the swinging stroke. Again, the relative size and shape of the rudder 150 relative to the sail 134 as a whole can vary from that shown in the figures.

Shown in FIG. 13 is another alternative embodiment of a sail 154 having a main body 156 that is pivotally attached to its arm 158 at a double pivot point along a "middle axis" 160 that is located back some distance from the leading edge 162 of the sail. In this configuration the entire sail 154 pivots about the middle axis 160, such that the pitch of the entire sail 154 is adjustable to promote the swinging motion of the arm 158, in the manner discussed above. The sail 154 of FIG. 13 also includes a moveable rudder 163 at its trailing edge, to provide additional control and power and assist in pivoting the main body 156 of the sail 154 at the end of each stroke. Again, the relative size and shape of the rudder 163 can vary from that shown in the figures.

It is to be appreciated that the various sail configuration alternatives shown in the figures herein can be mixed and matched in various ways. Different combinations of connection types and connection points of the sails on their respective arms can be used. Likewise, the size and shape of the sails and rudders can also vary in many ways. The sails and rudders shown in FIGS. 10-13 are generally rectangular and symmetrical. However, sails and rudders having different shapes can also be used. For example, the sail 18 shown in FIG. 2 has a slightly tapered shape, with a tapered leading edge. On the other hand, the sails 208, 218 shown in FIGS. 16 and 17 and discussed below have more of a shark fin shape. Other shapes can also be used.

It will also be apparent that the pivoting connection point of the sail panels upon the respective arms are different in the embodiments of FIGS. 11, 12 and 13. As noted above, in the configuration of FIGS. 12 and 13, the sails 134, 154 are pivotally attached to their respective arms near a "midpoint" of the respective sail panel 136, 156. In the embodiment of FIG. 11, however, the sail body 126 is pivotally attached to its arm 122 at or near the leading edge 124 of the sail body 126. Either of these configurations can be used. It is to be understood that the variables of moveable rudder versus no moveable rudder, and midpoint attachment versus leading edge attachment can be mixed and matched in various combinations.

As noted above, the configuration of the sails can affect the type and size or power requirements of the sail actuation and control system. For example, where a sail has a midpoint attachment, as illustrated in FIGS. 12 and 13, the sail can be bigger for a given actuation and control system since forces and stresses will be reduced due to the mid-sail attachment point, relative to a leading edge attachment point (as in FIG. 11) for a similarly sized sail.

The discussion above related to FIGS. 7A, 7B and FIG. 8 outlined an embodiment of a mechanical sail pitch adjustment mechanism. A similar system can be used for adjusting the orientation of a moveable rudder of a sail. Shown in FIGS. 14 and 15 are top views of an embodiment of a sail 164 attached to a swinging arm 166, the sail having a moveable rudder 168. The arm 166 and sail 164 are shown configured to swing in the direction of arrow 170 and at a position toward one extreme of the range of swinging of the arm. At this point the fluid flow, indicated by arrow 172, is at a significant angle with respect to the arm 166 and is nearly parallel with the sail 164.

The arm 166 includes a pitch lever 174 and a pair of cables 176, 178 that extend to the sail 164. The arm support structure 180 includes a pair of shift rods 182, which are positioned to contact a lever arm 184 of the pitch lever 174 whenever the main arm 166 swings to either extreme of its range of motion. When contacted in this way, the pitch lever 174 rotates in the manner discussed above with respect to FIGS. 7A, 7B and FIG. 8, causing it to pull on the cables 176, 178. The arm 166 can include a cable tensioning system for maintaining tension on these cables 176, 178. One embodiment of a cable tensioning system is shown in FIG. 14, and includes a first bent lever 181, which is generally V-shaped with two opposing arms, and is pivotally attached to the arm 166 adjacent to the pitch lever 174. The arms of the first bent lever 181 include pulleys 183 at their distal ends and tension springs 185 that extend back to connection points on the arm 166. The cables 176, 178 on either side of the arm 166 extend through the respective pulleys 183 of the first bent lever 181, which automatically maintains tension in these cables 176, 178 by the spring-assisted swinging motion of the first bent lever 181.

Following the first bent lever cable tensioning system, the cables 176, 178 are guided along the arm 166 by a series of pulleys 186, and pass through a second bent lever 188 prior to their connection to opposite ends of a pivot lever 190. The second bent lever 188 is pivotally attached near the distal end of the arm 166, but is not spring loaded. Its function is to guide the cables 176, 178 as the sail 164 pivots back and forth. As shown in the detail view of FIG. 15, the pivot lever 190 is attached to the rudder pivot lever 192 by a push rod 194. When the pivot lever 190 is rotated in one direction, this causes the push rod 194 to rotate the pivot lever 192 of the rudder 168 and therefore rotate the rudder 168 in the opposite direction.

Figure 16:
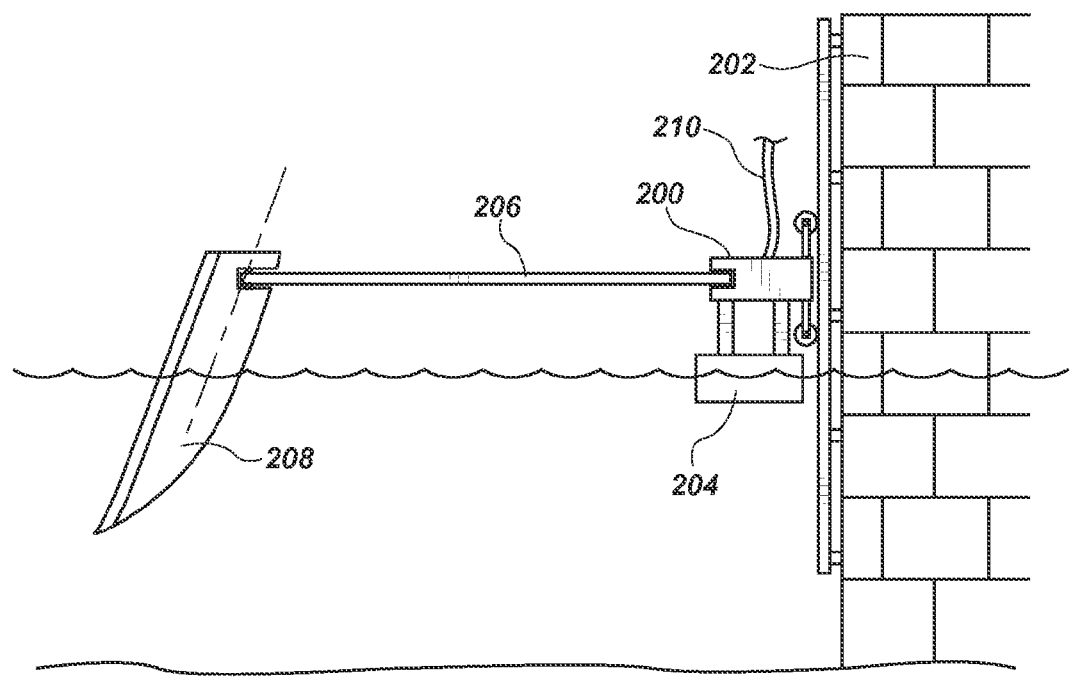
FIG. 16 is a side view of an embodiment of a hydrosail electrical generating device mounted upon a bridge pier in a river.
Figure 17:
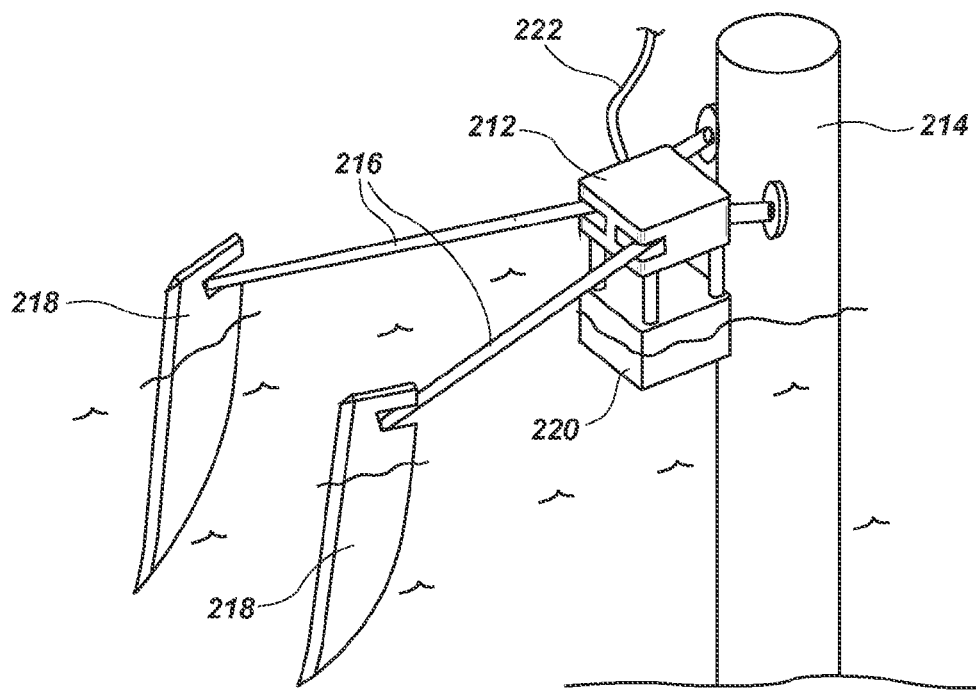
FIG. 17 is a perspective view of another embodiment of a hydrosail electrical generating device mounted upon a fixed structure in a body of water.

In addition to the barge-mounted configuration shown in FIGS. 1-4, a sail-based energy generating system in accordance with the present disclosure can be attached to a fixed structure in a flowing body of water, such as a bridge pier or other solid structure. Two embodiments of such a system are shown in FIGS. 16 and 17. In the embodiment of FIG. 16, an electrical generator and reduction gear base unit 200 is vertically slidably attached to a bridge pier 202, and includes a floatation buoy 204 that allows the entire base unit 200 to rise and fall with the level of the water. While only one swinging arm 206 is visible in the side view of FIG. 16, it is to be understood that a substantially identical arm is positioned on the far side of the visible arm 206. The swinging arms 206 extend from the base unit 200, with sails 208 disposed at the distal ends of the arms 206 and immersed in the water. An electrical cable 210 can extend from the base unit 200 to the bridge pier 202 to couple power from the base unit to the local power grid (not shown).

In another embodiment, shown in FIG. 17, a hydrosail electrical generating base unit 212 is vertically slidably attached to a vertical pole 214, which is anchored in the water. Like the other embodiments shown herein, the base unit 212 includes an electrical generator and reduction gear, with reciprocating arms 216 that extend from the generator unit and sails 218 at the distal ends of the arms 216. The sails 218 are immersed in the water, and generate reciprocal swinging motion in response to the flow of water therepast. In this embodiment, the generator and reduction gear base unit 212 includes a floatation buoy 220 that allows the entire unit to rise and fall with the level of the water, while a power line 222 transmits energy to the local power grid (not shown).

The sail-based energy generating system embodiments discussed above have been presented as being configured for generating energy from flowing water. However, water is not the only flowing fluid that can be used to generate energy. This same type of device can also be used in air to generate electricity from wind power, as shown and described with respect to FIGS. 18-22 below. A wind-based version of this device is referred to herein as an "aerosail." Moreover, air and water-based energy generation techniques can be used separately or together. That is, the hydrosail configuration can be augmented with aerosails as well. An example of a combined hydrosail and aerosail device mounted upon a floating barge is shown in a side view in FIG. 18. In this configuration, a combined hydrosail and aerosail energy generating system 224 is mounted upon a floating barge 226. The barge 226 is anchored in flowing water 228 in the manner discussed above with respect to FIGS. 1 and 2, and the hydrosails 230 are immersed in the water at the ends of arms 232 that are positioned in a trailing orientation with respect to the direction of flow 234 of the water 228. The arms 232 are attached to a first generator assembly 236, which can include a reduction gear assembly and sail pitch control devices, as discussed above, and generates electricity from the back and forth swinging motion of the arms 232.

A second generator assembly 238 is also attached to the barge 226, and includes a pair of arms 240 that extend from it. These arms 240 support a pair of sails 242 which are positioned in the air above the water 228 to draw energy from wind. In the same way flowing water causes the back and forth swinging motion of the hydrosail arms 232, the wind will cause back and forth swinging of the aerosail arms 240, thus generating electricity from the wind via the second generator assembly 238 and its associated reduction gear assembly, etc. Control of the pitch of the aerosails 242 and their rudders 244 can utilize any of the control mechanisms mentioned above, and the sail and rudder shape and connection aspects discussed above with respect to FIGS. 10-13 can also be chosen as desired. This generating system 224 is thus configured to generate electrical energy from motion of either or both the hydrosail arms 232 and the aerosail arms 240.

Given the different density of wind versus water, the aerosail panels 242 can be significantly larger than corresponding hydrosails 230 for comparable power output. Those of skill in the art will recognize that water flowing at a given velocity possesses significantly more kinetic energy than wind flowing at the same speed, simply due to the greater density of water. Consequently, a sail of a given size and shape, immersed in flowing water will produce more energy than the same size sail positioned in wind having the same velocity. Thus, the wind and water sails can be sized relative to the density of their respective flowing fluids, so that the typical energy output of the wind and water-based generators is substantially balanced, at least under certain conditions.

It is also to be appreciated that the two sail sets of a combined hydrosail and aerosail energy generating system can be designed or optimized to balance the system, so that a roughly comparable amount of energy is produced by the wind and water sail systems. Additionally or alternatively, the sails can be sized and dynamically adjusted in their pitch so that the in-and-out motion of both pairs of sails—both above and below the water line—runs at a substantially similar period at the same time. The sails can also be designed so that the air flow generates a larger level of the mechanical movement or energy than the water flow, or vice versa.

Figure 18:
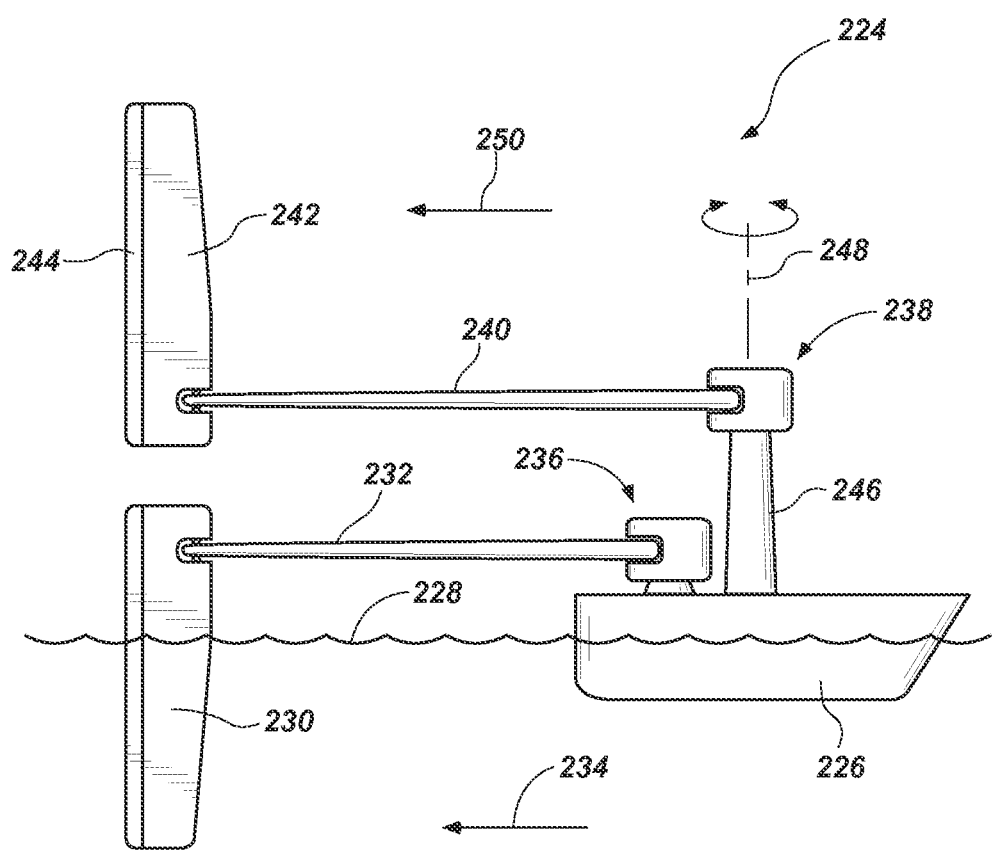
FIG. 18 is a side view of an embodiment of a combined hydrosail and aerosail device mounted upon a floating barge.

Those of skill in the art will recognize that wind changes speed and direction frequently, unlike rivers, which generally flow in only one direction and have a velocity that can be relatively constant. Consequently, the aerosail base unit 238 is pivotally attached to its support 246, so that it can pivot about a vertical axis 248 with changes in wind direction. While the view of FIG. 18 shows the aerosail arms 240 and hydrosail arms 232 substantially aligned with each other, this is for illustrative purposes only. It will be appreciated that this condition will only occur when the direction 250 of air flow happens to coincide with the direction 234 of the flowing water. In order to provide adequate resistance to overturning regardless of the angular orientation of the aerosail arms 240 relative to the orientation of the hydrosail arms 232, the barge 226 can have a size and shape that are selected with regard to these anticipated forces.

The sail pitch and rudder pitch control systems can be configured to adjust the relative angles of these features to accommodate different wind conditions and to reduce damaging stress upon the system. For example, when winds are particularly high, automatic pitch adjustment devices can be configured to reduce the angle of attack of the sail and/or rudder during each portion of the driving phase of the arm's swinging motion in order to reduce mechanical stress on the system and maintain a desired speed of reciprocation of the arms. On the other hand, when winds are light, the system can be configured to increase the angle of attack in order to obtain maximum energy from the wind.

Figure 19:
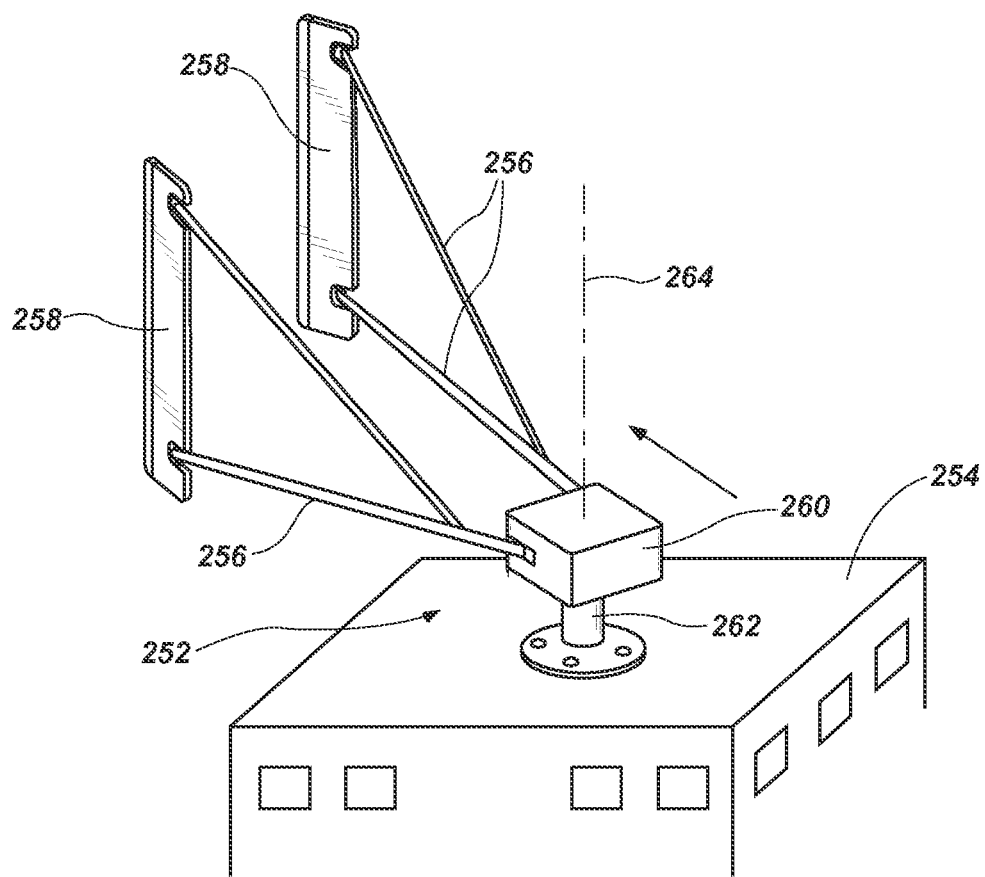
FIG. 19 is a perspective view of an embodiment of an aerosail electrical generating device mounted upon a fixed, elevated structure.
Figure 20:
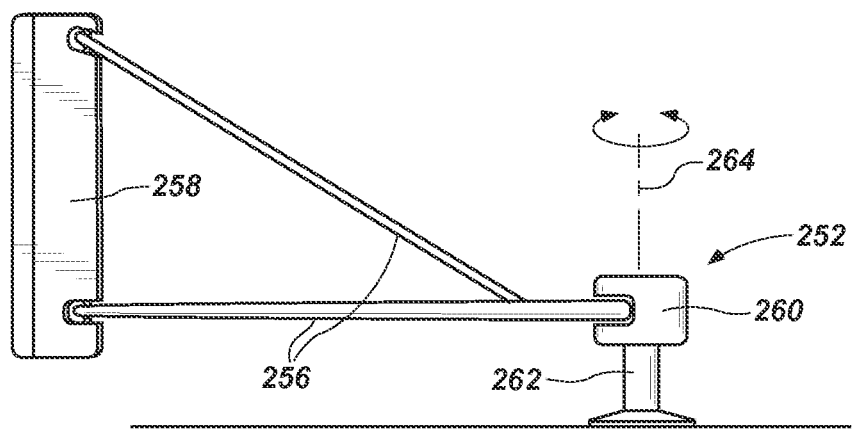
FIG. 20 is a side view of the aerosail device of FIG. 19.

Various embodiments of sail-based energy generating systems in accordance with the present disclosure having only aerosails can also be provided. Shown in FIGS. 19 and 20 are views of an embodiment of an aerosail electrical generating system 252 mounted upon a fixed, elevated structure 254. This unit operates in the same way as the hydrosail and aerosail configurations discussed above, and harnesses wind energy, rather than flowing water. The system 252 includes a pair of elongate arms 256, having proximal and distal ends, configured for substantially symmetrically opposing reciprocal swinging motion in a substantially horizontal plane. A pair of substantially vertical sails 258 are attached at the distal end of each of the elongate arms 256, and these sails are positioned to be driven in opposing reciprocal swinging motion by the wind. A generator base unit 260 is attached to the proximal ends of the pair of arms 256, and is configured to generate electrical energy from the swinging motion of the arms, as discussed above. Control of the pitch of the sails 258 and rudders can utilize any of the control mechanisms mentioned above, and the sail and rudder shape and connection aspects discussed above with respect to FIGS. 10-13 can also be chosen as desired. The generator unit 260 is pivotally attached to a support base 262, so that it can rotate about a vertical axis 264 in response to changes in wind direction. As shown in FIGS. 19 and 20, the aerosail electrical generation device can be attached to a fixed, elevated structure, such as a building or a pole. Where the system 252 is attached to a building, as shown in FIG. 19, it can be configured to provide power to that building alone, or it can be connected into the local power grid.

Figure 21:
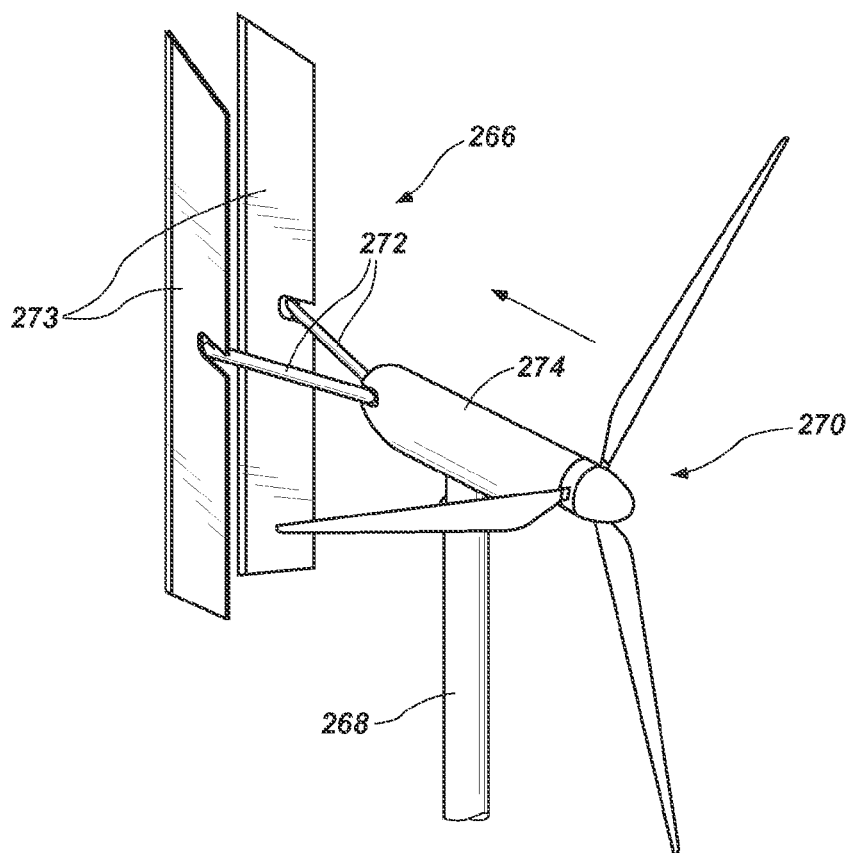
FIG. 21 is a perspective view of an embodiment of an aerosail electrical generating device mounted upon a wind generator.
Figure 22:
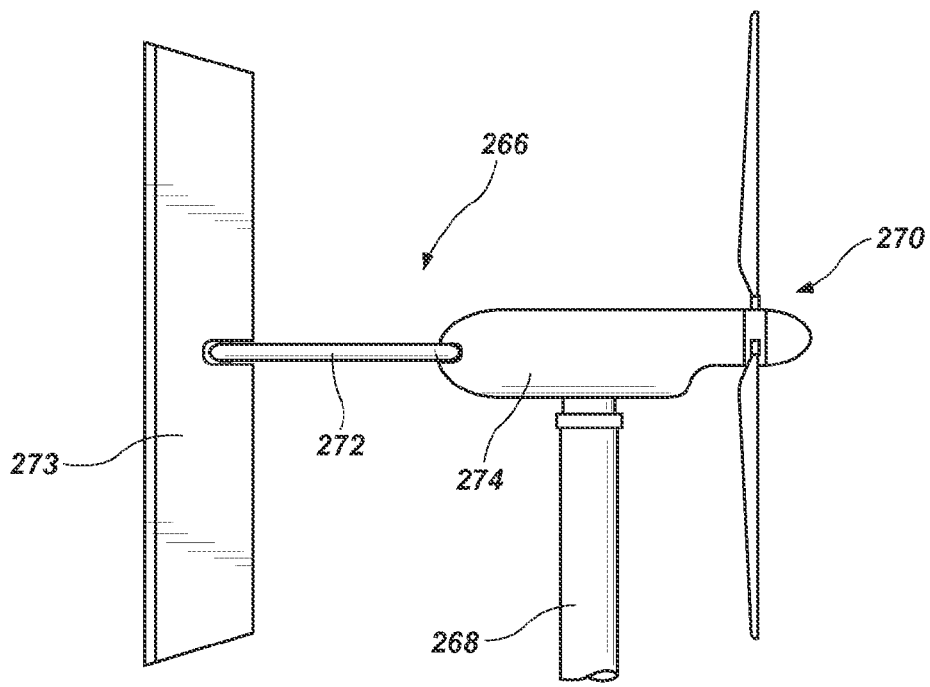
FIG. 22 is a perspective view of an embodiment of an aerosail electrical generating device mounted in a trailing orientation upon a wind generator nacelle.

In another embodiment, shown in FIGS. 21 and 22, an aerosail energy generating system 266 can be attached to a support pole 268 of a conventional propeller-type wind generator 270, thus providing an additional power generating device attached to an existing power-generating structure. In this embodiment, the aerosail device 266 is attached with arms 272 and sails 273 oriented in a trailing orientation upon the nacelle 274 of the wind generator 270, and the reduction gear and generator that are associated with the swinging arms 272 can be located within the wind generator nacelle 274. In this configuration, wind force upon the aerosail device 266 not only generates additional power, but also provides a wind vane effect upon the generator nacelle 274, thus augmenting the system that maintains its orientation into the wind. As with other embodiments discussed herein, control of the pitch of the sails 273 and rudders can utilize any of the control mechanisms mentioned above, and the sail and rudder shape and connection aspects discussed above with respect to FIGS. 10-13 can also be chosen as desired.

The system disclosed herein thus provides a method for generating electrical energy in a distributed manner using water flow below a water line and/or air flow. Providing this type of energy generating system can involve assembling a barge including opposing arms, the opposing arms having sails mounted on distal ends of the opposing arms. The barge can float and be anchored in a low speed body of water, and can generate mechanical movement of the opposing arms from the air flow and the water flow captured by the sails and the rudders. This mechanical energy can be captured or harnessed and converted to electrical energy by a generator.

This system and method is also highly scalable. It can be embodied in a small device that attaches to a boat to generate small amounts of power for campers, for example, or it can be sized for utility-scale power generation for cities or factories, or any size in between. Those of skill in the art will recognize that power generation and power conditioning features, such as transformers, rectifiers and the like, can be selected as called for by the amount of current and voltage that the system generates.

Advantageously, this system generates electrical energy with very low environmental impact, using air and water flows that are typically viewed as not enough to be practical. It is also believed to be relatively inexpensive to produce and operate, quick and easy to install or remove, and is believed to involve relatively low-maintenance. Furthermore, it is believed that this system will not significantly affect birds, fish or other marine life, or river and air flows, since it generates electricity with no pollution emissions or fueling costs, and the swinging arms reciprocate at relatively low speeds. Additionally, the system disclosed herein is a distributed modular power generation system rather than a centralized generation system, and can be attached to moving vehicles. For example, a system in accordance with this disclosure can be mounted on a large ship, such as a tanker or container ship, to provide additional electrical power for propulsion or other purposes. Many other applications and adaptations are also possible.

It is to be understood that the above-referenced arrangements are exemplary illustrations of the various aspects of the present disclosure. It will be apparent to those skilled in the art that numerous modifications of one or more of the disclosed examples can be made without departing from the principles and concepts of the present disclosure and the appended claims.

What is claimed is:

1. An energy generating system, comprising:
    a first pair of elongate arms, having proximal and distal ends, configured for substantially symmetrically opposing reciprocal swinging motion in a substantially horizontal plane;
    a first pair of substantially vertical sails, each sail attached at the distal end of one of the elongate arms, the sails being configured to drive opposing reciprocal swinging motion of the arms in response to a flow of fluid therepast; and
    a first generator assembly, attached to the proximal ends of the first pair of arms, configured to generate electrical energy from the substantially symmetrical opposing reciprocal swinging motion of the arms.

2. A system in accordance with claim 1, wherein the first sails are pivotally moveable with respect to the arms about a substantially vertical axis, whereby a pitch of the sails is adjustable to promote the opposing reciprocal swinging motion.

3. A system in accordance with claim 1, wherein each sail includes a moveable rudder.

4. A system in accordance with claim 1, wherein the first sails are at least partially immersed in flowing water.

5. A system in accordance with claim 4, wherein the energy generating system is disposed upon a floating platform that is anchored in the water.

6. A system in accordance with claim 4, wherein the energy generating system is attached to fixed structure in the water.

7. A system in accordance with claim 4, further comprising:
    a second pair of elongate arms, having proximal and distal ends, configured for substantially symmetrically opposing reciprocal swinging motion in a substantially horizontal plane;
    a second pair of substantially vertical sails, each sail attached to the distal end of one of the second pair of arms, the sails disposed in air above the flowing water; and
    a second generator assembly, attached to the proximal ends of the second pair of arms, configured to generate electrical energy from the substantially symmetrical opposing reciprocal swinging motion of the second arms.

8. A system in accordance with claim 1, further comprising:
    a pitch control mechanism, configured for selectively adjusting a pitch of at least a part of each sail, so as to drive the substantially symmetrical opposing reciprocal motion of the arms;
    a crank assembly, having a shaft, attached near the proximal ends of the arms, configured to convert the opposing reciprocal motion of the arms into unidirectional rotational motion of the shaft; and
    an electrical generator, attached to the shaft, configured to generate electrical energy from rotation of the shaft.

9. A system in accordance with claim 1, wherein the energy generating system is attached to an upright support and the sails are positioned to be moved by wind.

10. A system in accordance with claim 9, wherein the energy generating system is attached to a support pole of a wind generator.

11. A sail-based energy generating system, comprising:
    a first pair of substantially vertical sails, attached at distal ends of a pair of elongate arms, the sails being configured to drive opposing reciprocal swinging motion of the arms in response to flow of fluid therepast, at least a portion of the first sails being pivotally moveable about a substantially vertical axis, whereby a pitch of the sails is adjustable to drive the opposing reciprocal swinging motion; and
    a first generator assembly, attached to the proximal ends of the elongate arms, configured to generate electrical energy from the substantially symmetrical opposing reciprocal swinging motion of the arms.

12. A system in accordance with claim 11, wherein the generator assembly further comprises:
    a mechanism for selectively adjusting the pitch of the sails;
    a gear wheel, having a shaft;
    a pair of drive rods, each drive rod pivotally attached between the gear wheel and a position near the proximal end of one of the arms, configured to unidirectionally rotate the gear wheel in response to reciprocal swinging motion of the arms;
    a flywheel, attached to the shaft; and
    an electrical generator, attached to the shaft, configured to generate electrical energy from rotation of the shaft.

13. A system in accordance with claim 11, wherein the first pair of sails are at least partially immersed in flowing water, and further comprising:

a second pair of substantially vertical sails, positioned in air above the water, each of the second pair of sails being attached to a distal end of one of a second pair of arms; and a second generator assembly, attached to proximal ends of the second arms, configured to generate electrical energy from substantially symmetrical opposing reciprocal swinging motion of the second arms.

14. A system in accordance with claim 13, wherein the energy generating system is disposed upon a floating platform that is anchored in the water.

15. A system in accordance with claim 11, wherein the energy generating system is attached to a fixed structure positioned in the flowing fluid.

16. A method of generating electrical energy, comprising:
disposing a first pair of sails in a flowing fluid, the sails being mounted on distal ends of first opposing arms;
periodically adjusting a pitch of the first pair of sails so as to generate an opposing reciprocal swinging motion of the first opposing arms in response to flow of the fluid past the first sails; and
capturing mechanical energy of the opposing reciprocal swinging movement of the opposing arms in a first generator assembly and generating electrical energy therefrom.

17. A method in accordance with claim 16, further comprising at least partially immersing the first pair of sails in flowing water.

18. A method in accordance with claim 17, further comprising:
mounting the first opposing arms and the first generator assembly upon a floating barge and anchoring the barge in the flowing water;
mounting a second pair of sails on distal ends of second opposing arms;
attaching the second opposing arms to a second generator assembly above a water line of the flowing water;
periodically adjusting a pitch of the second sails so as to generate an opposing reciprocal swinging motion of the second opposing arms in response to flow of air past the second sails; and
collecting the opposing reciprocal swinging movement of the second opposing arms in the second generator assembly as electrical energy.

19. A method in accordance with claim 16, further comprising disposing the first opposing arms and the first generator assembly upon an elevated structure, the first sails being positioned to generate opposing reciprocal motion of the first opposing arms from flow of wind therepast.

20. A method in accordance with claim 19, wherein the elevated structure comprises a wind generator tower, and further comprising:
disposing the first opposing arms in a trailing orientation upon a wind generator nacelle, wind force upon the first sails providing a wind vane effect upon the generator nacelle.

* * * * *